United States Patent Office 2,836,533
Patented May 27, 1958

2,836,533
NEMATOCIDE

Eli Seifter, Dayton, Ohio, assignor to Monsanto Chemical Company, St. Louis, Mo., a corporation of Delaware No Drawing. Application December 28, 1955
Serial No. 555,790

2 Claims. (Cl. 167—14)

This invention relates to the control of soil-inhabiting worms and more particularly to the inhibition and eradication of nematodes.

The nematode is an important economic pest, considered to be responsible for annual field crop losses of several hundred million dollars value in the United States alone. Practically all known species of crop and ornamental plants are subject to nematode attack. The root-knot nematode, for example, is responsible for crop reduction, extending up to total loss, of such important economic species as sugar beets, potatoes, citrus crops, etc. Nematode attack may also weaken crops so as to produce accentuated susceptibility to other agricultural hazards such as fungal diseases.

Among presently known agents effective for the control of nematodes certain volatile fumigants are recognized as effective treatments, but present difficulties in application, in that they are gaseous compounds requiring pressured containers for storage, etc. Attempts have, therefore, been made to provide solid compounds which are nematocidal by the synthesis of compounds related to these gaseous fumigants which would have the same effectiveness and yet be more readily useful. Thus, for example, since carbon disulfide is known to be a nematocidal fumigant, solid compounds containing a carbon disulfide grouping have been synthesized and tested as nematocides. However, it has been found that not all carbon disulfide derivatives are effective nematode toxicants, whether because they are ineffective in penetrating the difficultly permeable membrane surrounding the various stages in the nematode's existence, e. g., the egg, larvae, and adult stages, or for other reasons, is not known. Difficulties are also encountered with the phytotoxicity of such compounds as are found to be nematocidal, and since the object of nematode-eradicating treatments is to minimize crop damage by these parasites, a necessary attribute of an economically useful nematocidal treatment is that the residues remaining from such treatments should be non-phytotoxic.

Accordingly, it is an object of the present invention to provide a method for the control of nematodes. A further object is to provide solid nematocidal compositions. Another object of this invention is to provide a method of treating soil so as to produce a non-phytotoxic environment free of nematode inhabitants. These and other objects of the present invention are attained as described hereinbelow.

In accordance with the present invention, nematode infestations in soil are controlled by applying to the soil an alkaline salt of tetrathioperoxycarbonic acid. The term "alkaline salt" as used herein is intended to embrace the alkali metal and ammonium salts. The tetrathioperoxycarbonate alkaline salts are readily available compounds which may be prepared, e. g., as described in copending application Serial No. 495,064, filed March 17, 1955, by M. L. Nielsen and B. D. Stone, assigned to the same assignee as the present application.

The use of the present tetrathioperoxycarbonates as nematocides is illustrated by the following example:

Example 1

In this test method, nematocidal activity is estimated from the rate of flexing of a suspension of the nematode *Penagrellus redivivus* in water. The effect of the nematocide is expressed as the percentage of the normal flexing rate of a control dispersion of the nematodes which does not contin a nematocidal agent. Thus, sodium tetrathioperoxycarbonate was introduced into an aqueous culture of *P. redivivus* at a concentration of 0.1%. The following table sets forth the motility of the nematodes as compared to a control culture identical to the test culture, except for the tetrathioperoxycarbonate content.

| Motility After— | Culture Containing the Sodium Tetrathioperoxycarbonate | Control Culture |
| --- | --- | --- |
| | Percent | Percent |
| 10 min | 20 | 100 |
| 20 min | 15 | 100 |
| 30 min | 5 | 100 |
| 2 hr | 2 | 100 |
| 24 hr | 0 | 100 |

Example 2

Nematocidal testing of sodium tetrathioperoxycarbonate in soil was conducted as follows: 500 g. of uninfected soil in a container was inoculated with the root-knot nematode Meloidogyne spp., by addition of a suspension of the ground, washed roots of plants infected by the nematode, after which the soil was mixed with solid sodium tetrathioperoxycarbonate to give a concentration in the soil equivalent to a rate of 400 lbs. per acre. The container was then drenched with water, capped, and allowed to stand for one week, at the end of which time a two-week old Marglobe tomato seedling was transplanted to the container. A tomato seedling was also planted in an untreated, but similarly inoculated, control container of soil. After a growing period of two months, the tomato plants were harvested, and the roots washed and examined for evidence of infection. Roots of plants which had been grown in the treated and inoculated soil were substantially free of infection, whereas those of the control, i. e., plants grown in the inoculated but untreated soil, were heavily infested.

When dry sodium tetrathioperoxycarbonate was applied to furrows in a replicated field test, at a rate of 100 lbs. per acre, it was found that this treatment reduced the nematode count per hundred grams of soil from 220 to 75, i. e., gave a 66% control of the nematode infestation in the soil.

Similarly, the ammonium, potassium, lithium, cesium, and rubidium tetrathioperoxycarbonates may be applied to soil for the reduction of the nematode population thereof. The present tetrathioperoxycarbonates are effective in eliminating or suppressing nematode activity when applied to soil at rates of 50 to 500 lbs. per acre. Usually, concentrations of from 100 to 250 lbs. per acre will produce effective nematode control in soils of average infestation level. Lightly-infected areas may be treated effectively with smaller concentrations. The compounds may be applied to the soil, e. g., as dusts, compounded with inert carriers such as talc, bentonite, fuller's earth, etc., or in admixture with other agricultural agents such as soil-conditioning agents, fertilizers, etc., or as aqueous solutions, e. g., in irrigation water.

In addition to use in soils, the compositions of the invention may also be applied to other nematode environments, such as greenhouse potting mixtures and other soil substitutes. The tetrathioperoxycarbonates of the invention are also useful in destroying animal and/or parasitic worms such as flukes and tapeworms during the soil phase of their life cycle, and may be usefully applied, e. g., to barnyards and other soils which it is desired to sterilize.

Although the invention has been described with reference to certain specific embodiments thereof, it is to be understood that various modifications and adaptations of the arrangements herein disclosed may be made as readily occur to persons skilled in the art, without constituting a departure from the spirit and scope of the invention as defined in the objects and in the appended claims.

What is claimed is:
1. The method of controlling nematodes which comprises exposing said nematodes to a toxic quantity of a nematocidal composition comprising as the essential active ingredient an alkaline tetrathioperoxycarbonate salt.
2. The method of controlling nematodes which comprises exposing said nematodes to a toxic quantity of a nematocidal composition comprising as the essential active ingredient, sodium tetrathioperoxycarbonate.

References Cited in the file of this patent
UNITED STATES PATENTS
2,676,129  Bashour _____ Aug. 20, 1954